US006994553B2

(12) United States Patent
DaRif et al.

(10) Patent No.: US 6,994,553 B2
(45) Date of Patent: Feb. 7, 2006

(54) PAINT COLOR CARD AND METHODS OF USING THE SAME

(75) Inventors: Mary M. DaRif, Twinsburg, OH (US); Barbara A. Merriman, Olmsted Falls, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 10/765,788

(22) Filed: Jan. 27, 2004

(65) Prior Publication Data

US 2004/0181925 A1 Sep. 23, 2004

Related U.S. Application Data

(62) Division of application No. 10/026,041, filed on Dec. 21, 2001.

(60) Provisional application No. 60/258,594, filed on Dec. 28, 2000.

(51) Int. Cl.
*G09B 19/00* (2006.01)

(52) U.S. Cl. .......... 434/98

(58) Field of Classification Search .......... 434/72, 434/74, 75, 98, 99, 100, 105
See application file for complete search history.

(56) References Cited

U.S. PATENT DOCUMENTS

| | | | | |
|---|---|---|---|---|
| 750,620 | A | 1/1904 | Dohse | 434/98 |
| 3,224,113 | A | 12/1965 | Goldsholl | 434/98 |
| 3,486,912 | A | 12/1969 | Dyson | 106/22 |
| 3,565,039 | A | 2/1971 | Remer | 118/643 |
| 3,632,382 | A | 1/1972 | Reed et al. | 117/38 |
| 3,908,563 | A | 9/1975 | Eckart, Jr. | 108/77 |
| 3,967,009 | A | 6/1976 | Blake | 427/256 |
| 4,003,470 | A | 1/1977 | Lagorio et al. | 211/50 |
| 4,078,325 | A | 3/1978 | Valentine | 40/388 |
| 4,102,072 | A | 7/1978 | Buschman | 40/124.2 |
| 4,104,809 | A | 8/1978 | Day et al. | 35/28.5 |
| 4,177,314 | A | 12/1979 | Steeves | 428/336 |
| 4,265,038 | A | 5/1981 | Crosslen | 40/124.2 |
| 4,379,696 | A | 4/1983 | Lerner | 434/98 |
| 4,457,718 | A | 7/1984 | Lerner | 434/98 |
| 4,992,050 | A * | 2/1991 | Edwards | 434/98 |
| 5,010,669 | A | 4/1991 | Moran | 40/539 |
| 5,174,758 | A | 12/1992 | Abramson | 434/98 |
| 5,255,456 | A | 10/1993 | Franklin | 40/124.1 |
| 5,277,302 | A | 1/1994 | Seisa | 206/1.8 |
| 5,312,001 | A | 5/1994 | Sorensen | 211/50 |

(Continued)

FOREIGN PATENT DOCUMENTS

EP 0 587 321 A2 3/1994

(Continued)

OTHER PUBLICATIONS

Database WPI— Section PO, Week 199633, Derwent Publications Ltd., London, GB; Class P85, AN 1996-325295 XP002902571 & JP 08 146882 A (Sumitomo Forestry Co Ltd), Jun. 7, 1996—abstract.

(Continued)

*Primary Examiner*—Kurt Fernstrom
(74) *Attorney, Agent, or Firm*—Arthi K. Tirey; Robert E. McDonald; Paul R. Katterle

(57) ABSTRACT

A paint color card having a substrate with a surface coated with a layer of a colored coating composition formulated to have a dried color that is substantially similar to the dried color of a commercially-available paint composition. The paint color card has a plurality of perforations at least partially defining a chip section that may be detached or folded over to form a window.

9 Claims, 8 Drawing Sheets

U.S. PATENT DOCUMENTS

| | | | | |
|---|---|---|---|---|
| 5,359,793 | A | 11/1994 | Copperstone | 40/124.1 |
| 5,728,427 | A | 3/1998 | Akkerman et al. | 427/288 |
| 5,743,407 | A | 4/1998 | Williams | 206/575 |
| 5,746,600 | A | 5/1998 | Chang | 434/98 |
| 5,803,739 | A | 9/1998 | Hitchcock | 434/78 |
| D412,010 | S | 7/1999 | Lindley et al. | D17/20 |
| 5,951,057 | A | 9/1999 | Spector | 283/117 |
| 5,967,562 | A | 10/1999 | Tubbs et al. | 283/114 |
| 5,974,388 | A | 10/1999 | Durham | 705/1 |
| 5,985,413 | A | 11/1999 | Boyle et al. | 428/174 |
| 6,006,927 | A | 12/1999 | Levy | 211/51 |
| 6,112,665 | A * | 9/2000 | Teter et al. | 101/483 |
| 6,270,123 | B1 | 8/2001 | Spangler | 283/114 |
| 6,382,676 | B1 | 5/2002 | Cochran et al. | 283/51 |
| 6,416,612 | B1 | 7/2002 | Lerner et al. | 156/277 |
| 6,585,522 | B1 * | 7/2003 | Simmons | 434/395 |
| 6,743,020 | B2 * | 6/2004 | Pestl | 434/100 |

FOREIGN PATENT DOCUMENTS

| | | | |
|---|---|---|---|
| EP | 0587321 | * | 3/1994 |
| GB | 319519 | | 9/1929 |
| GB | 324366 | | 1/1930 |
| GB | 1153441 | | 5/1969 |

OTHER PUBLICATIONS

Database WIP—Section PO, Week 199954, Derwent Publications Ltd., London, GB; Class P85, AN 1999-623584 XP002902570 & JP 11 272179 A (Kanebo Ltd), Oct. 8, 1999—abstract.

3 pages of the International Search Report for International Application No. PCT/US01/49240 corresponding to U.S. Appl. No. 10/026,041.

* cited by examiner

PAINT COLOR CARD AND METHODS OF USING THE SAME

CROSS-REFERENCE TO RELATED APPLICATION

This application is a divisional of co-pending U.S. patent application Ser. No. 10/026,041, filed on Dec. 21, 2001, which claims the benefit of U.S. Provisional Application No. 60/258,594, filed Dec. 28, 2000.

BACKGROUND OF THE INVENTION

The present invention is directed to paint color cards and methods of using the same to market and select paints.

Merchants who sell paint typically provide color samples of their paint to assist customers in selecting paint having a desired color and texture. Conventionally, multiple color samples are arranged on a single piece of heavy paper or cardboard, commonly referred to as a color strip or color card. In a typical color card, the color samples comprise small rectangular chips or swatches, each having an area less than about 2 square inches. The swatches are of different colors and are arranged in close proximity to each other on only one side of the color card. Usually, the swatches are different tints and shades of a particular hue. A conventional color card typically has a length of about 6–10 inches and a width of about 1 to 2 inches.

Conventionally, color cards are displayed in fan decks and racks. In both of these types of display, the color cards are stacked on top of each other. In a fan deck, the color cards have aligned openings through which a pin or shaft extends. The color cards may be pivoted along the shaft in opposing directions to fan the cards out so that a plurality of the color cards may be viewed at one time. In a conventional rack, stacks of different color cards are held in rows of mounting slots or pockets, with each stack being comprised of identical color cards. In this manner, when a prospective purchaser removes one of the color cards from a stack, an identical color card comes into view, thereby maintaining a full display of all the different color cards.

Conventional color cards have several deficiencies. When a color sample of particular interest is viewed next to other color samples in a conventional color card, the human eye tends to blend the colors together, thereby giving the viewer an inaccurate impression of the color sample of particular interest. The small size of the color samples in a conventional color card also fails to impart the same intensity the corresponding paint would have on a large surface. A further deficiency of conventional color cards is that they are not adapted for determining the compatibility of paint to elements within an environment in which the paint is to be utilized. For example, if it is desired to evaluate the compatibility of a particular paint to fabric on a couch, a conventional color card containing the color sample corresponding to the paint is simply held up next to the couch and an evaluation is made. This type of comparison is merely unidirectional and fails to simulate the effect that will be produced when the couch is surrounded by a wall covered with the paint.

In order to remedy some of the foregoing deficiencies of conventional color cards a color card has been developed wherein the color card contains only one color sample. More specifically, the entire side of the color card is one color. This type of color card addresses the color blending and intensity deficiencies, but does not address the deficiency with regard to determining compatibility.

Based on the foregoing, there is a need in the art for a paint color card that addresses the color blending and intensity deficiencies of conventional color cards and is also adapted for determining compatibility. The present invention is directed to such a paint color card and methods of using the same.

SUMMARY OF THE INVENTION

It therefore would be desirable, and is an advantage of the present invention, to provide a paint color card having a substrate with a surface coated with a layer of a colored coating composition formulated to have a dried color that is substantially similar to the dried color of a commercially-available paint composition. The paint color card has formed therein a plurality of perforations defining a detachable chip section.

Also provided in accordance with the present invention is a paint color card having formed therein a plurality of perforations arranged in at least one tear line. The at least one tear line at least partially defines a chip section. When the at least one tear line is severed, the chip section is movable to form a window in the paint color card. The paint color card has a substrate with a surface coated with a layer of a colored coating composition formulated to have a dried color that is substantially similar to the dried color of a commercially-available paint composition.

Also provided in accordance with the present invention is a method of marketing, paint to a prospective purchaser. In accordance with the method, a paint color card is provided having a substrate with a surface coated with a layer of a colored coating composition formulated to have a dried color that is substantially similar to the dried color of a commercially-available paint composition. The paint color card has formed therein a plurality of perforations arranged in at least one tear line. The at least one tear line at least partially defines a chip section, wherein when the at least one tear line is severed, the chip section is movable to form a window in the paint color card. A display rack is provided having a wall. The display rack is adapted for removably holding the paint color card. The paint color card is placed in the display rack such that the layer of the colored coating composition is directed outwardly and the chip section is covered by the wall, thereby preventing the chip section from being grabbed by the prospective purchaser when the prospective purchaser removes the paint color card from the display rack.

Also provided in accordance with the present invention is a method of selecting paint. In accordance with the method, a paint color card is selected having a substrate with a surface coated with a layer of a colored coating composition formulated to have a dried color that is substantially similar to the dried color of a commercially-available paint composition. The paint color card has formed therein a plurality of perforations arranged in at least one tear line. The at least one tear line at least partially defines a chip section, wherein when the at least one tear line is severed, the chip section is movable to form a window in the paint color card. An item is selected for comparison to the colored coating composition. The at least one tear line is severed and the chip section is moved to form a window in the paint color card. The paint color card is disposed over the item such that the item may be viewed through the window.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

Figure 2:
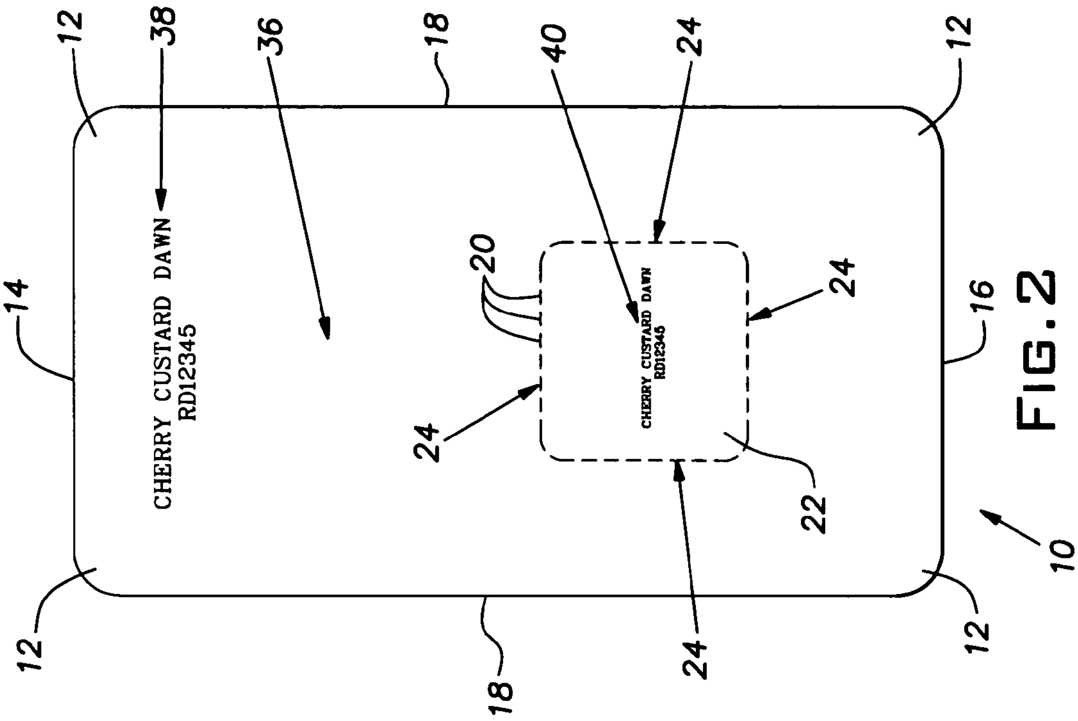
FIG. 2 shows a planar view of a second side of the first paint color card.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

As used herein with regard to a particular coating or paint composition, the terms "dried appearance", "dried color", and "dried finish" shall respectively mean the appearance, color, and finish of the coating or paint composition when dried.

Figure 1:
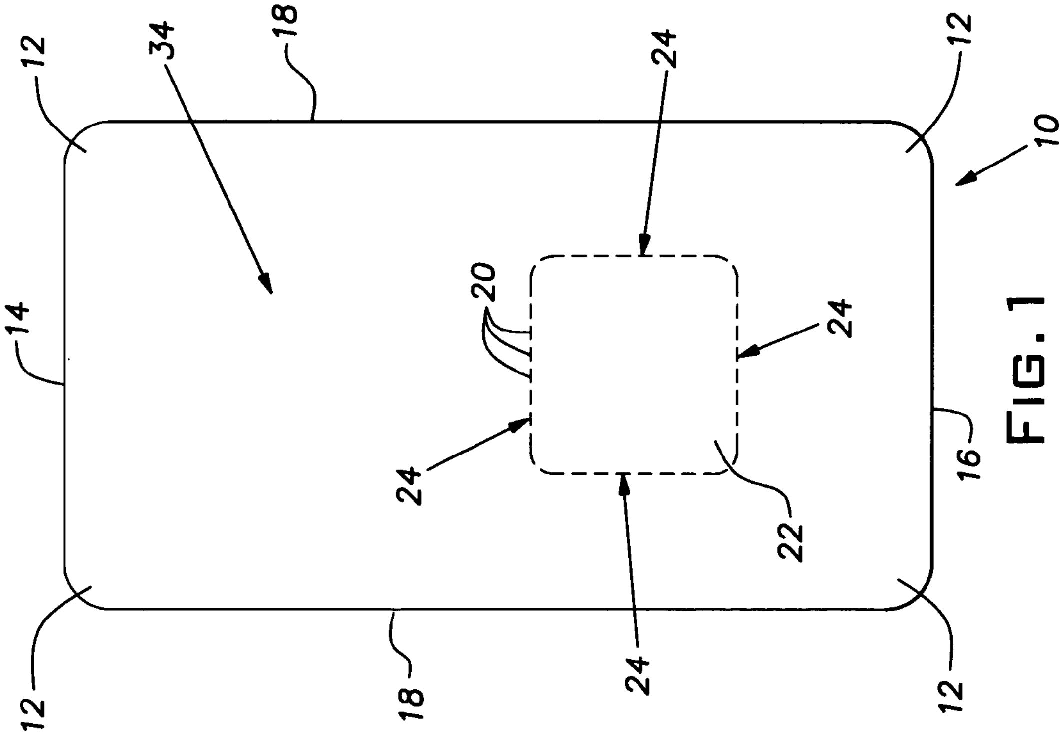
FIG. 1 shows a planar view of a first side of a first paint color card.

Referring now to FIGS. 1 and 2, there are shown plan views of opposing sides of a first paint color card 10 constructed in accordance with a first embodiment of the present invention. Preferably, the first paint color card 10 is generally rectangular in shape and has rounded corners 12. The specific dimensions of the first paint color card 10 are primarily chosen based on marketing considerations. Physical constraints imposed by the manner in which the first paint color card 10 is to be displayed, however, are also taken into account. Generally, the first paint color card 10 has a length between top and bottom edges 14, 16 of from about 3 inches to about 12 inches, a width between side edges 18 from about 2 inches to about 6 inches, and a length to width ratio of greater than 1 and less than about 4. In one specific application, the first paint color card 10 has a length of about 5.5 inches, and a width of about 3 inches, thereby yielding a length to width ratio of about 1.8.

The first paint color card 10 has formed therein a plurality of perforations 20 defining a chip section 22. As will be described more fully below, the chip section 22 is detachable from the first paint color card 10. The perforations 20 are arranged in tear lines 24 that completely define the chip section 22. Thus, the chip section 22 is surrounded by other portions of the first paint color card 10. In this manner, when the chip section 22 is detached for the first paint color card 10, a window 26 (shown in FIG. 12) is formed in the first paint color card 10. The window 26 is defined by jagged interior edges 27 created at the tear lines 24 when the tear lines 24 are severed. Preferably, the tear lines 24 are arranged to generally form a square with rounded corners, thereby providing the chip section 22 with a generally square shape with rounded corners. The tear lines 24 are preferably located so as to position the chip section 22 substantially midway between the side edges 18, and in a lower portion of the first paint color card 10, toward the bottom edge 16. Preferably, the tear lines 24 are of such length as to provide a ratio of a side length of the chip section 22 to the width of the first paint color card 10 of about 0.2 to about 0.8. In the specific application referred to above, wherein the first paint color card 10 has a length of about 5.5 inches and a width of about 3 inches, the side length of the chip section 22 is about 1.25 inches. It should be appreciated that the present invention is not limited to the chip section 22 having a generally square shape. The chip section 22 may have a circular shape, an elliptical shape, a triangular shape, or any other type of shape; however, a generally square shape is preferred.

Figure 3:
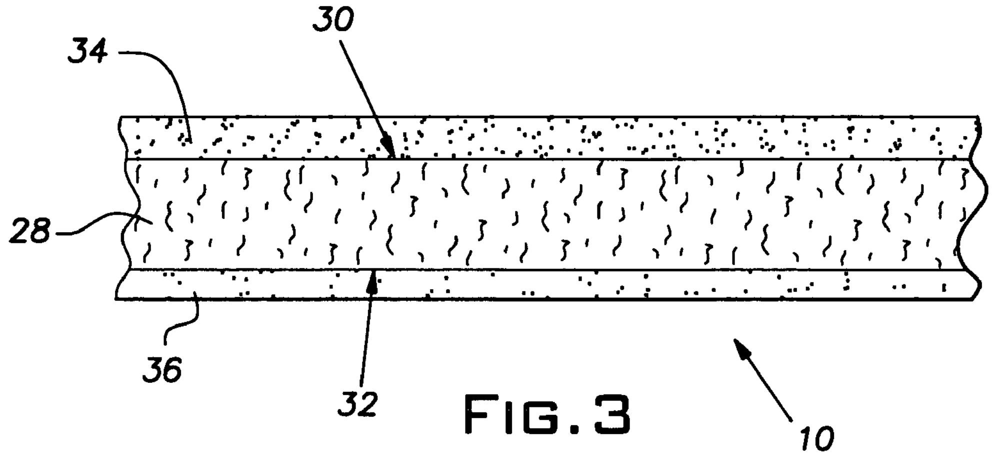
FIG. 3 shows a schematic side elevational view of a portion of the first paint color card.

Referring now also to FIG. 3 there is shown a schematic side elevational view of a portion of the first paint color card 10. The first paint color card 10 is comprised of a substrate 28 having opposing planar first and second surfaces 30, 32. The first surface 30 is completely coated with a layer 34 composed of a first colored coating composition. In this manner, the side of the paint color card 10 with the layer 34 is all one color and functions as one large color sample. Preferably, the substrate 28 has sufficient thickness to prevent the first paint color card 10 from curling or becoming rumpled at the edges 14–18. The substrate 28 may be composed of a cellulosic material, such as thick paper or cardboard, or a polymeric material, such as acrylic coated polypropylene or polyethylene terephthalate. Paper having a thickness of 10 pts, or greater has been found to be useful as the substrate 28.

The first colored coating composition may be a solvent-borne coating composition or a latex composition. A suitable solvent-borne coating composition includes a cellulose-derivative resin, such as nitrocellulose, cellulose acetate, ethyl cellulose, or cellulose acetate butyrate, and one or more organic solvents, such as acetone, methylethyl ketone, methyl acetate, methanol, ethanol, and/or nitromethane. A suitable latex composition includes one or more acrylic resins dispersed in an aqueous medium. If the substrate is composed of a cellulosic material, the first colored coating composition is preferably a solvent-borne coating composition. A latex composition may be used with a cellulosic substrate, however, the cellulosic substrate should be sized to seal its pores against the water in the latex composition.

The first colored coating composition is formulated to have a dried appearance that corresponds to the dried appearance of a first commercial paint composition that is available for sale from a merchant who sells paint. More specifically, the first colored coating composition is formulated with pigments and/or dyes to have a dried color that is the same or is substantially similar to the dried color of the first commercial paint composition. This "color matching" is performed with a spectrophotometer or colorimeter and preferably a computer, using known color matching processes. An example of color matching process that may be used is disclosed in U.S. Pat. No. 4,887,217 to Sherman, et al., which is assigned to the assignee of the present invention, and which is hereby incorporated by reference. In addition to being color matched, the first colored coating composition is preferably formulated to have a dried finish (e.g., gloss, satin, eggshell, etc.) that is the same or is substantially similar to the dried finish of the first commercial paint composition.

The first commercial paint composition may be an architectural paint, an automotive paint, or any other type of paint. Since paint color cards are predominately used for architectural paints, the first paint color card 10 finds particular utility for use with architectural paint, such as exterior latex house paint.

Although the first colored coatings composition and the first commercial paint composition have the same or substantially similar color, the first colored coating composition and the first commercial paint composition may have different compositions. For example, the first colored coatings composition may be a solvent-borne composition, while the first commercial paint composition may be a latex composition.

Preferably, the second surface 32 of the substrate 28 is completely coated with a thin layer 36 of a polymeric coating composition that imparts a glossy finish to the second surface 32. The polymeric coating composition may be comprised of a polyester, urethane, acrylic, epoxy, or vinyl resin. First indicia 38 are printed over the second surface 32 of the substrate, in an upper portion of the first paint color card 10, toward the top edge 14. Second indicia 40 may also be printed over the second surface 32 of the substrate 28 in the chip section 22. The first and second indicia 38, 40 may be printed directly on the second surface 32 of the substrate 38, or, more preferably, on the layer 36 of the polymeric coating composition. Depending on the size of the chip section 22, it may necessary for the second indicia 40 to have a smaller print size than the first indicia 38 so as to fit in the chip section 22. Preferably, the first and second indicia 38, 40 each include a name and an identifying code for the first commercial paint composition to which the first colored coating composition corresponds. As shown in FIG. 2, an example of a name for the first commercial paint composition is "CHERRY CUSTARD DAWN" and an example of an identifying code is RD12345. The name and/or the identifying code of the first commercial paint composition is/are used to produce the first commercial paint composition at the point of sale, as will be described below.

Conventionally, a merchant who sells paint stocks several different base compositions and a number of different colorant compositions. Most of the commercial paint compositions the merchant offers for sale are a combination of one of the base compositions and one or more colorant compositions, which are mixed together at the point of sale. The amount of base composition and the amount(s) of colorant composition(s) required to produce a particular commercial paint composition are contained in formulas that are stored in a book and/or a computer system located at the merchant's facility. The formulas are identified by the names and/or identifying codes for the commercial paint compositions the formulas represent.

With regard to the first paint color card 10, the name "CHERRY CUSTARD DAWN" and/or the identifying code RD12345 identify a formula for the first commercial paint composition to which the first colored coating composition corresponds. For example the formula may be 1 gallon of a neutral base composition, 4/32 fluid ounces of a red colorant composition, 2/32 fluid ounces of a magenta colorant composition and 3/32 fluid ounces of a yellow colorant composition.

Upon viewing the first colored coating composition of the first paint color card 10, a customer may decide that the corresponding first commercial paint composition has a desired color for a particular application. After making this decision, the customer takes the first paint color card 10 to a mixing station at the merchant's facility. An employee of the merchant at the mixing station views the name "CHERRY CUSTARD DAWN" and/or the identifying code RD12345 on the first paint color card 10 and retrieves the formula identified thereby from a formula book or computer system at the mixing station. The employee then mixes the appropriate amounts of the neutral base composition, and the red, magenta, and yellow colorant compositions specified by the formula to yield the first commercial paint composition, which is then provided to the customer.

Figure 4:
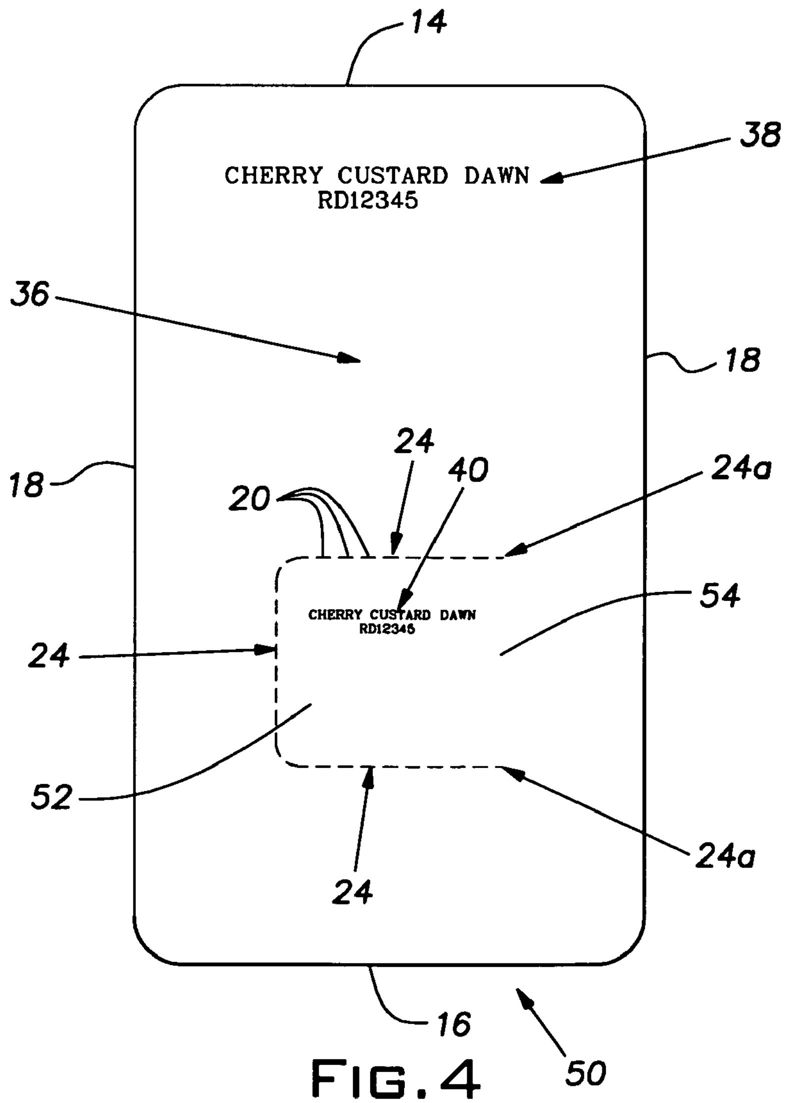
FIG. 4 shows a planar view of a second side of a second paint color card having a chip section partially formed therein.
Figure 6:
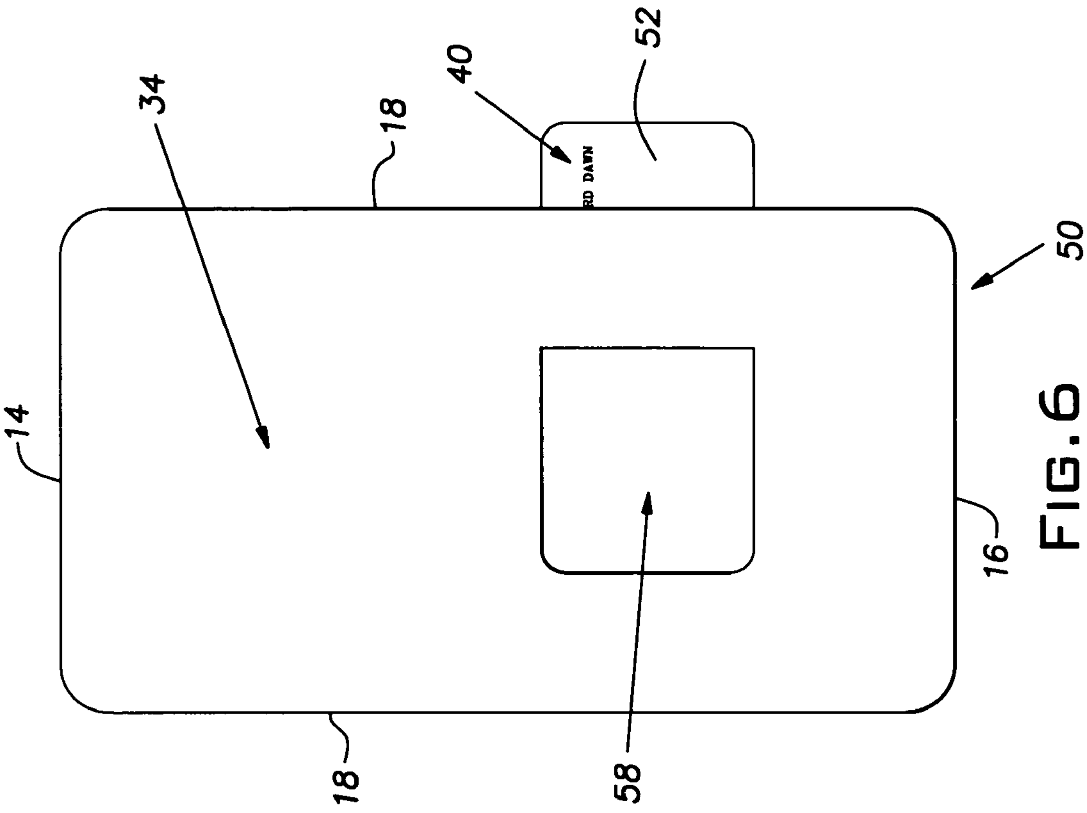
FIG. 6 shows a planar view of a first side of the second paint color card with the chip section folded over to form a window.
Figure 5:
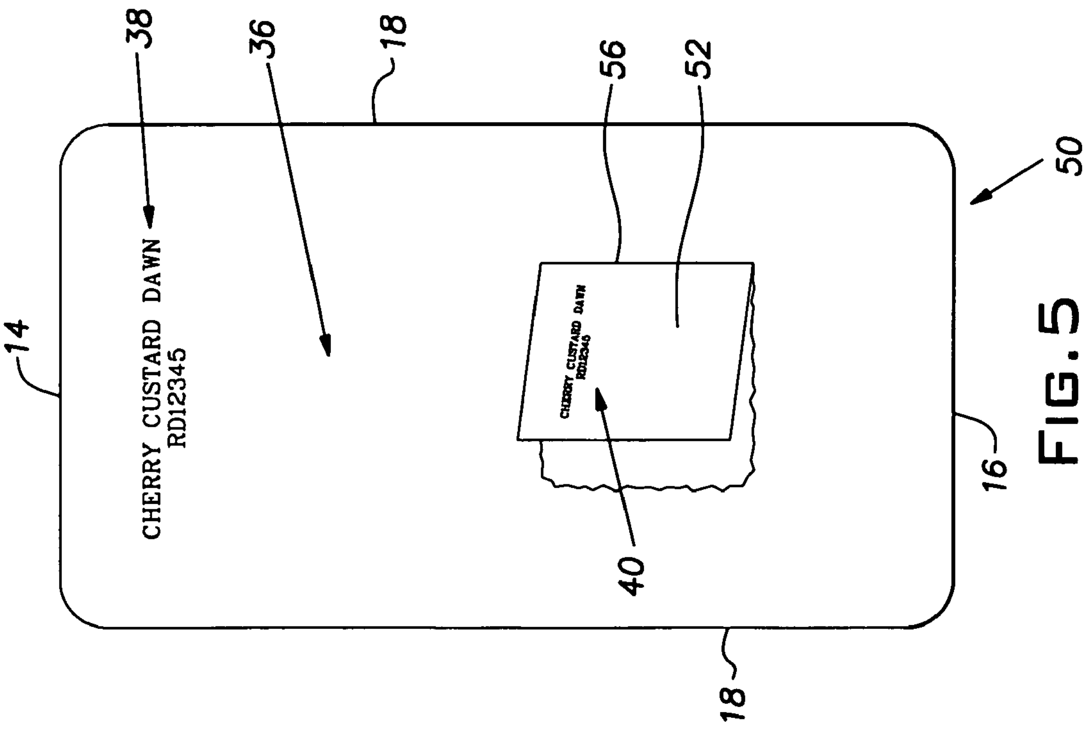
FIG. 5 shows a planar view of the second side of the second paint color card with the chip section fully formed therein.

Referring now to FIGS. 4–6, there is shown a second paint color card 50 constructed in accordance with a second embodiment of the present invention. The second paint color card 50 has the same construction as the first paint color card 10, except for the differences described below. One of the tear lines 24 is not present and the remaining tear lines 24 only partially define a chip section 52. Ends 24*a* of the tear lines 24 are separated by a space 54 in which the second paint color card 50 is not perforated. The chip section 52 is fully defined when the tear lines 24 are severed and a straight fold line 56 is formed in the space 54, between the ends 24*a* of the tear lines 24. The chip section 52 is generally square and has the same dimensions as the chip section 22 of the first paint color card. The chip section 52 may be folded over the second surface 32 of the second paint color card 50, thereby forming a window 58, as shown in FIG. 6. As with the first paint color card 10, the present invention is not limited to the chip section 52 having a generally square shape. The chip section 52 may have other shapes. For example, the perforations 20 may be arranged in a singular semi-circular tear line. When the semi-circular tear line is severed and a fold line is subsequently formed between the ends thereof, a chip section is formed having a flattened circular shape.

Figure 8:
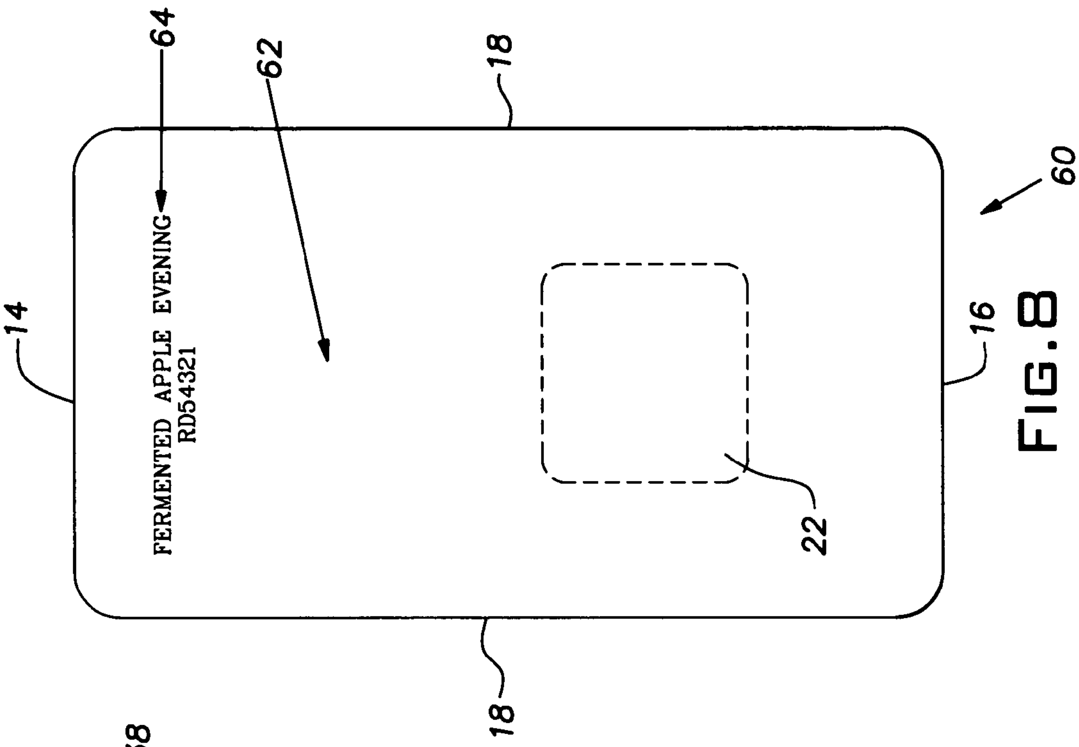
FIG. 8 shows a planar view of a second side of the third paint color card.
Figure 7:
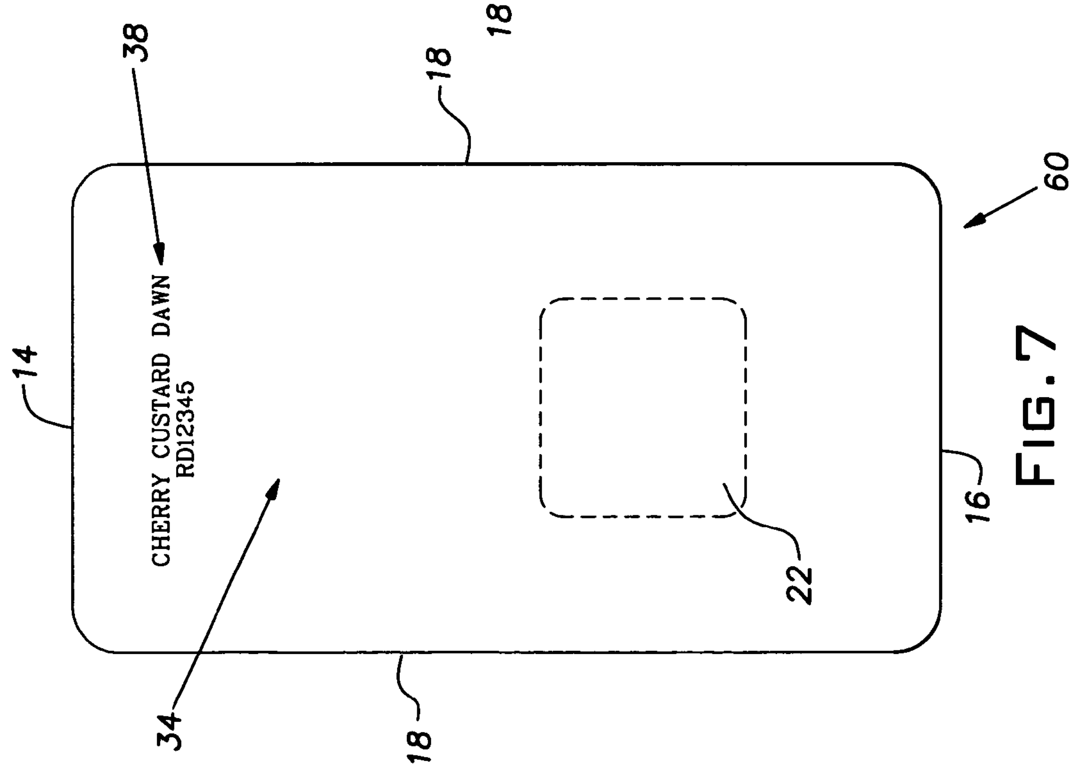
FIG. 7 shows a planar view of a first side of a third paint color card.

Referring now to FIGS. 7–8, there is shown a third paint color card 60 constructed in accordance with a third embodiment of the present invention. The third paint color card 60 has the same construction as the first paint color card 10, except for the differences described below. The second surface 32 of the third paint color card 60 is not coated with the layer 36 of the polymeric coating composition and the first and second indicia 38, 40 are not printed over the second surface 32. Instead, the second surface 32 is coated with a layer 62 composed of a second colored coating composition, and the first indicia 38 are printed over the first surface 30. As with the first colored coating composition, the second colored coating composition may be a solvent-borne coating composition or a latex composition. The second coating composition is formulated to have a dried color that is the same or is substantially similar to the dried color of a second commercial paint composition that is available for sale from a merchant who sells paint. The dried color of the second commercial paint composition is different from the dried color of the first commercial paint composition. Thus, the first and second colored coating compositions have different dried colors. Preferably, however, the dried colors of the first and second coatings compositions are complementary.

The first indicia 38 are printed on the layer 34 of the first colored coating composition, over the first surface 30. The first indicia 38 are located in an upper portion of the third paint color card 60, toward the top edge 14.

Third indicia 64 are printed on the layer 62 of the second colored coating composition, over the second surface 32. The third indicia 64 are also located in the upper portion of the third paint color card 60, toward the top edge 14. Similar to the first indicia 38, the third indicia 64 preferably includes a name and an identifying code for the second commercial paint composition to which the second colored coating composition corresponds. As shown in FIG. 8, an example of a name for the second commercial paint composition is "FERMENTED APPLE EVENING" and an example of an identifying, code for the second commercial paint composition is RD54321. As with the name and the identifying code for the first commercial paint composition, the name "FERMENTED APPLE EVENING" and/or the identifying code RD54321 identify, a formula for the second commercial paint composition to which the second colored coating composition corresponds.

It should be appreciated that instead of being composed of the second colored coating composition, the layer 62 may be composed of the first colored coating composition. In such an event, the third indicia 64 is removed and may be replaced by a fourth indicia identical to the first indicia 38. In this manner, opposing sides of the third paint color card 60 are substantially identical.

Figure 9:
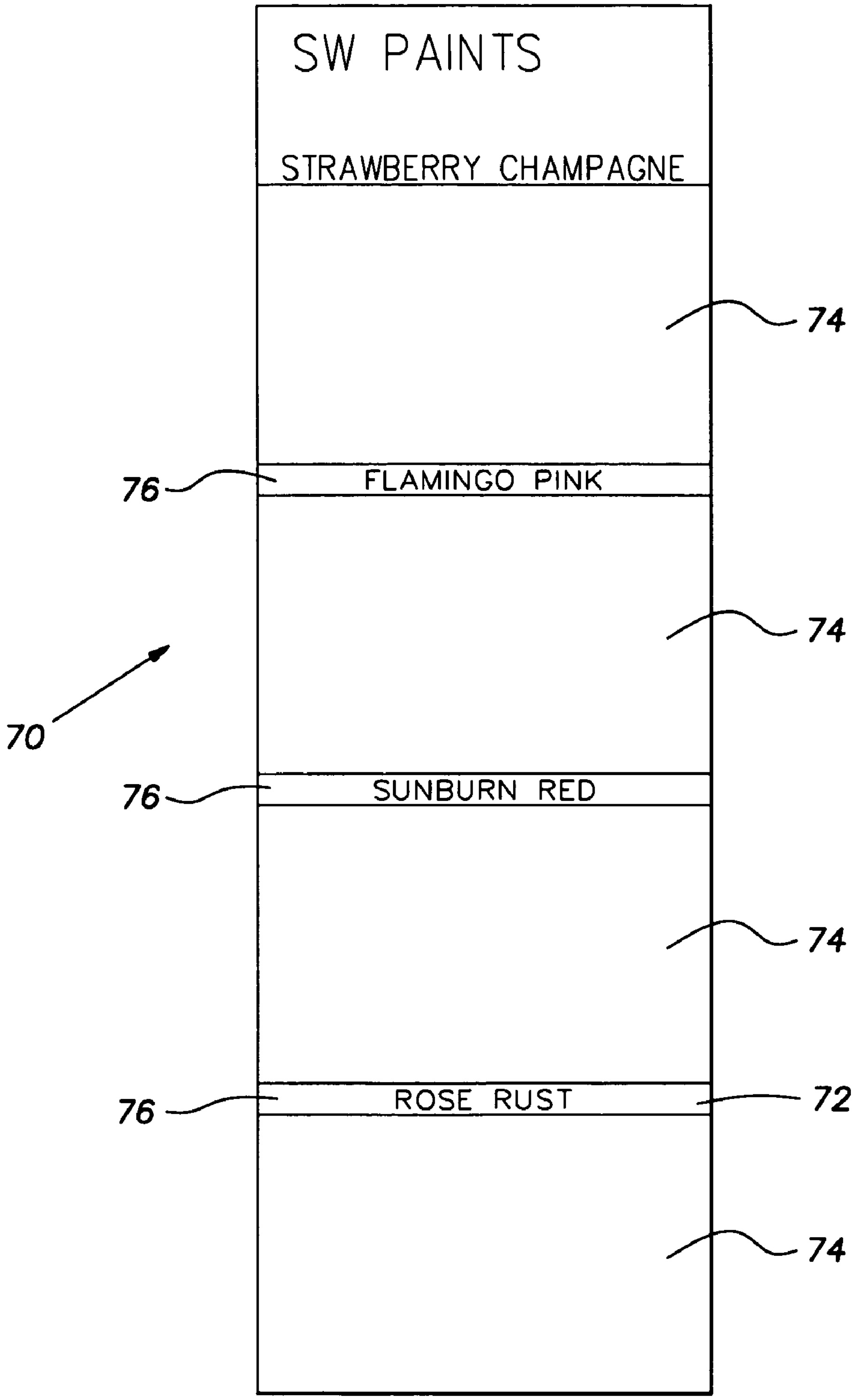
FIG. 9 shows a planar view of a color strip.

Referring now to FIG. 9, a color strip 70 is shown that man be used with the first paint color card 10, the second paint color card 50, or the third paint color card 60 to determine color compatibility. The color strip 70 is comprised of a substrate 72, such as paper, having a planar first surface with a plurality of color swatches 74 formed thereon. The color swatches 74 are comprised of different colored coating compositions and are separated by strips 76 of uncoated portions of the substrate 72. The colored coating compositions are formulated to have dried colors that are the same or substantially similar to the dried colors of additional commercially-available paint compositions, which have dried colors different from the first and second commercial paint compositions. The dried colors of the additional commercially-available paint compositions and, thus, the dried colors of the colored coating compositions may be different tints and shades of a particular hue, or, less preferably, they may be different hues. For purposes of description, it will be assumed that the dried colors of the additional commercially-available paint compositions and, thus, the colored coating compositions are different tints and shades of a particular hue.

Each of the color swatches 74 is preferably rectangular in shape and has a size greater in every direction than the chip section 22 of the first paint color card 10. In this manner, a color swatch 74 will completely fill the window 26 formed by the detachment of the chip section 22 when the window 26 is placed over the color swatch 74.

Names and/or identifying codes for the additional commercially-available paint compositions are printed on the color strip 70. The names and/or identifying codes may be printed on the first surface, in the strips 76, adjacent to their corresponding color swatches 74.

The first, second, and third paint color cards 10, 50, 60 and the color strip 70 may be displayed in a fan deck or, more preferably, in a display rack. When the first, second, and third paint color cards 10, 50, 60 are displayed in a display rack, the chip sections 22, 52 are preferably covered by a wall or a plate so that the chip sections 22, 52 will not be grabbed by customers when the customers remove the first, second, and third paint color cards 10, 50, 60 from the display rack, thereby reducing the chances that the chip sections 22, 52 will be inadvertently detached from the first, second, and third paint color cards 10, 50, 60.

Figure 10:
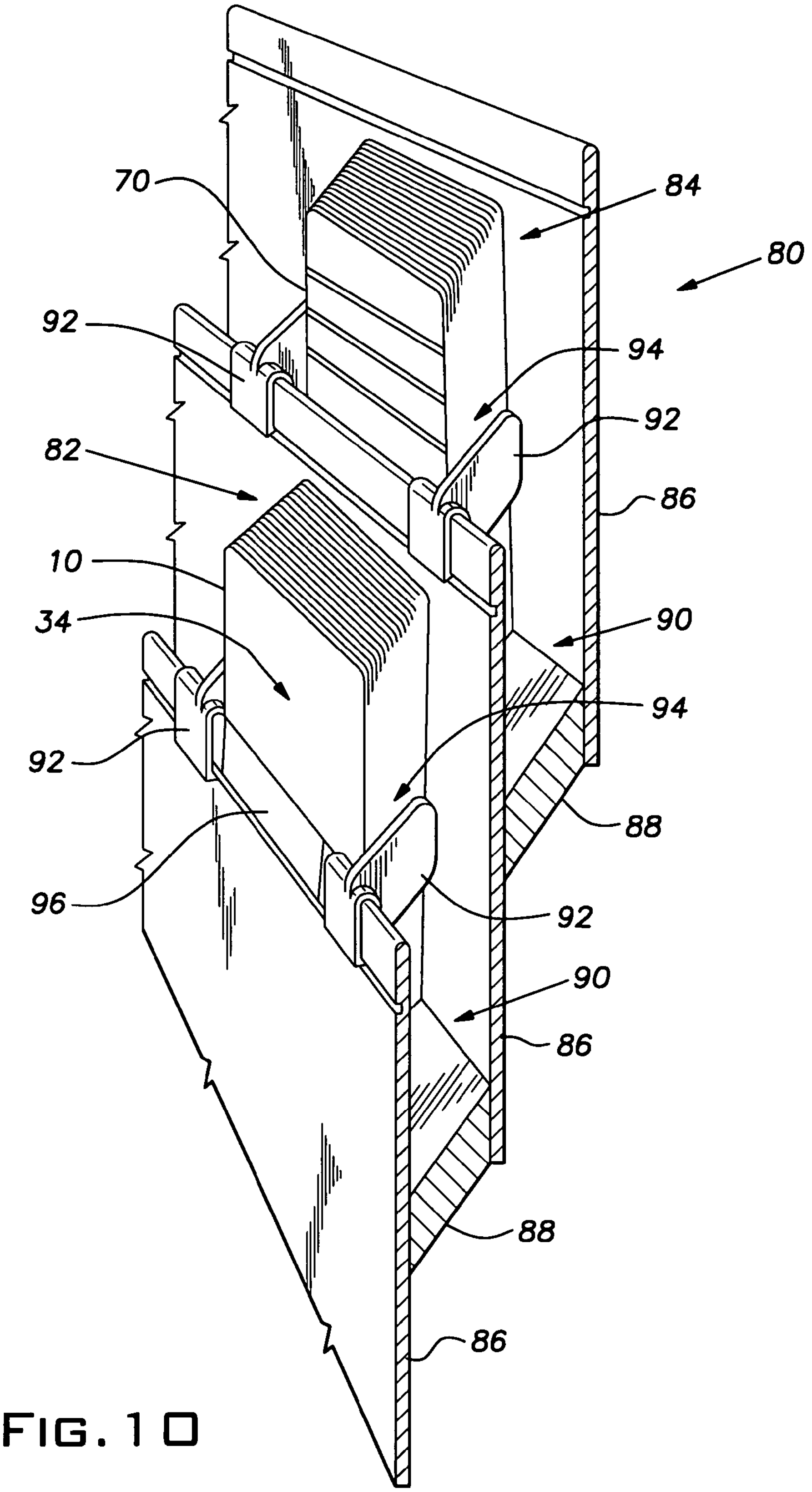
FIG. 10 shows a perspective view of a portion of a display rack holding a stack of the first paint color cards and a stack of the color strips.

Referring now to FIG. 10 there is shown a portion of a display rack 80 holding a stack 82 of the first paint color cards 10 and a stack 84 of the color strips 70. The display rack 80 includes a plurality of spaced-apart vertical walls 86 arranged in a tiered manner. A plurality of horizontal walls 88 are secured between the vertical walls 86 to define a plurality of tiered troughs 90. Dividers 92 are secured to top portions of the vertical walls 86 and extend rearwardly thererfrom. The dividers 92 are spaced apart to divide each trough into a plurality of pockets 94.

The stack 82 of the first paint color cards 10 is disposed in one of the pockets 94. In the stack 82, all of the first paint color cards 10 are positioned to stand vertically, with the layers 34 directed outwardly and the bottom portions of the first paint color cards 10 directed downwardly. With the first paint color cards 10 so arranged, the layer 34 of an outermost one of the first paint color cards 10 is clearly visible to a customer so that the customer may evaluate the color thereof. The chip sections 22 are disposed behind a vertical wall 86 and the bottom edges 16 are supported on a horizontal wall 88. In this manner, the chip sections 22 are covered by the vertical wall 86 and, thus, are protected from being inadvertently detached. A label 96 is secured to a top portion of the vertical wall 86 and includes the same information as the first indicia 38.

The stack 84 of the color strips 70 is disposed in another one of the pockets 94 located adjacent to and above the stack 82 of the first paint color cards 10. In the stack 84, all of the color strips 70 are positioned to stand vertically, with their color swatches 74 directed outwardly so that a customer may evaluate the colors thereof.

Although not shown, the trough 90 containing the stack 84 of the color strips 70 may contain a plurality of stacks of other color strips having the same construction as the color strip 70, but of different colors, and the trough 90 containing the stack 82 of the first paint color cards 10 may contain a plurality of stacks of other color cards having the same construction as the first paint color card 10, but of different colors. Such an arrangement facilitates the selection of a color strip for a particular color card and vice versa.

Figure 11:
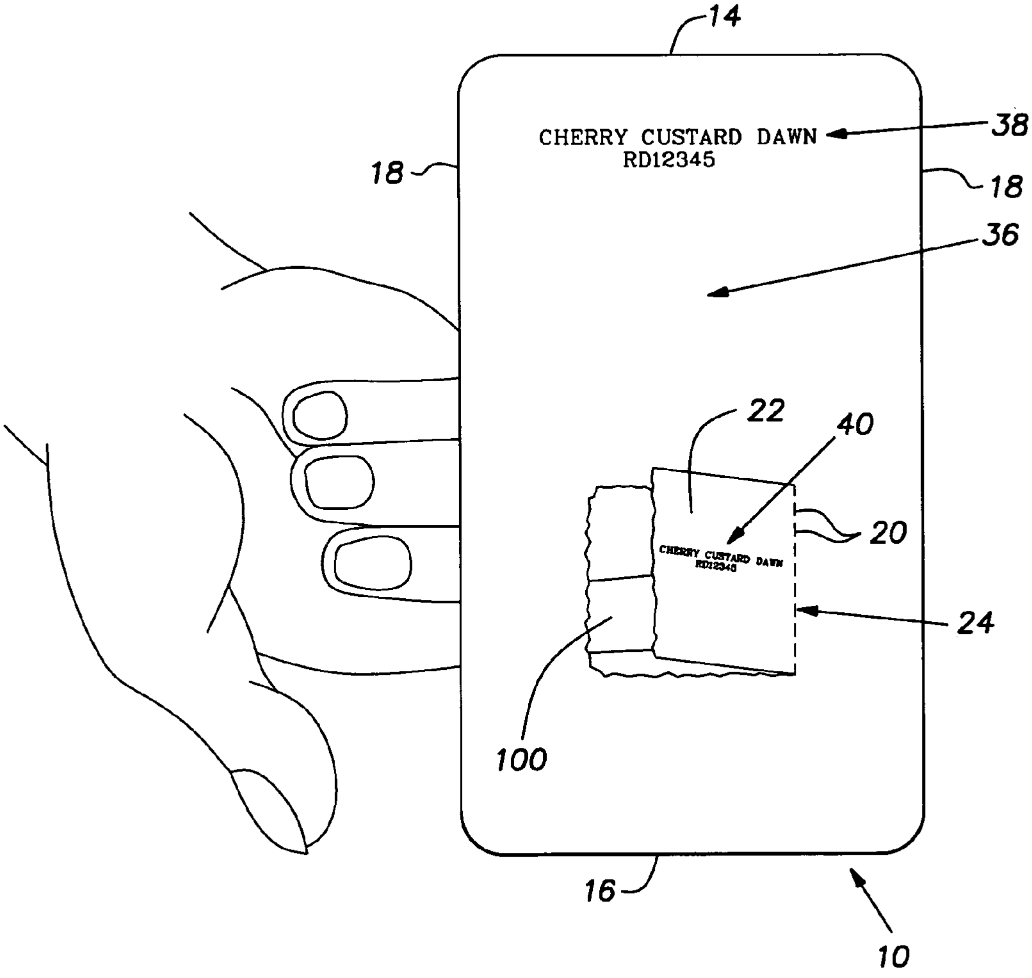
FIG. 11 shows a chip section being detached from the first paint color card.
Figure 12:
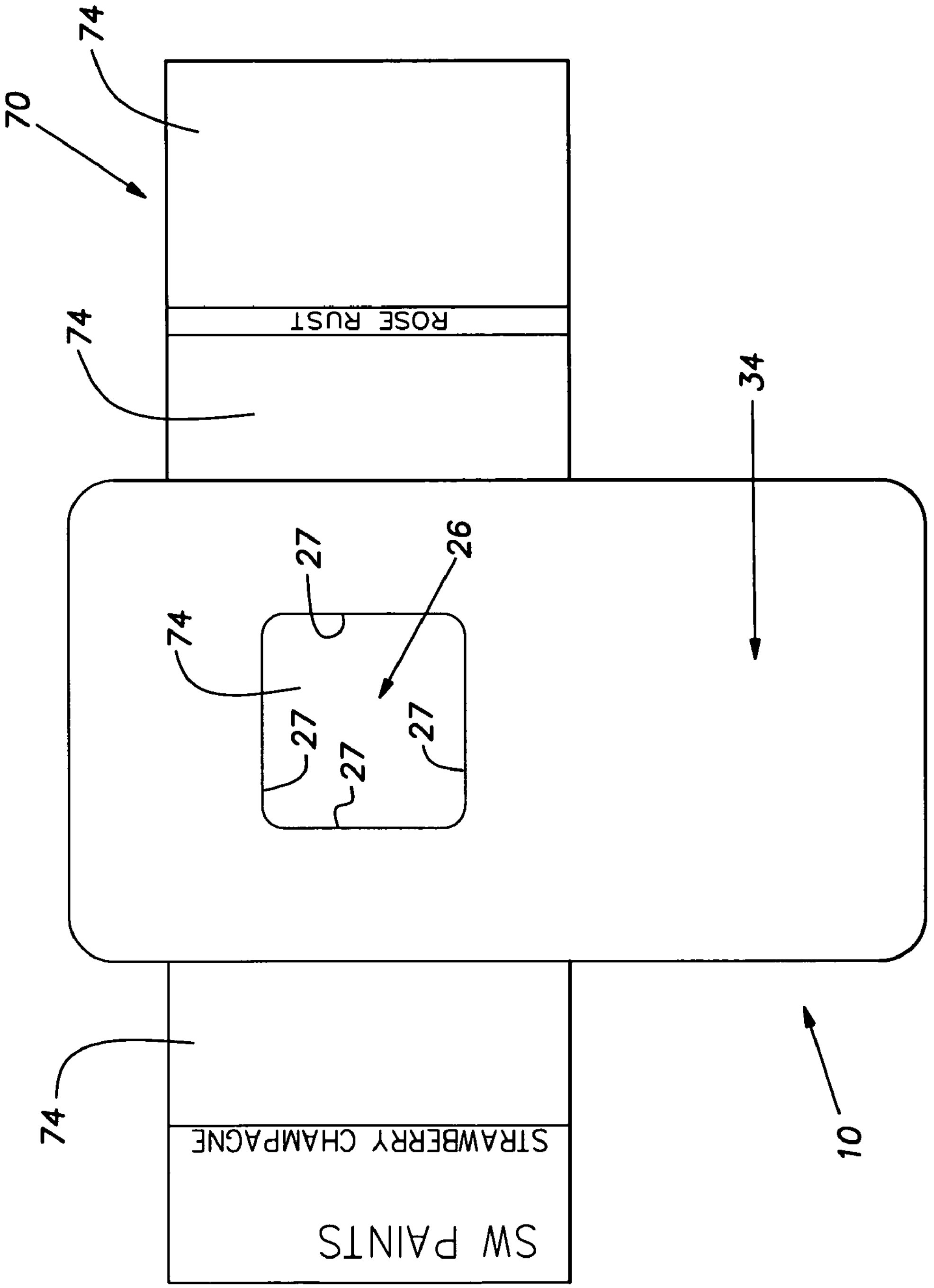
FIG. 12 shows the first paint color card disposed over the color strip.

Referring now also to FIGS. 11 and 12, a method will be described for using the first paint color card 10 and the color strip 70 to select a commercially-available paint composition for a frame of a cabinet and a different commercially-available paint composition for doors of the cabinet. The color cards in the display rack 80 are viewed to determine a desired color for the commercially-available paint composition for the frame of the cabinet. For ease of description, it will be assumed that the color of the first commercial paint composition is desired based on the color of the first colored coating composition on the first paint color card 10. The top portion of the first paint color card 10 is grasped and the first paint color card 10 is removed from the display rack 80. The color of the first colored coatings composition is then compared to the color strips in the display rack 80 to roughly determine a desired hue for the commercially-available paint composition for the doors of the cabinet. For ease of description, it will be assumed that the hue of the additional commercially-available paint compositions is desired based on the colors of the color swatches 74 on the color strip 70. A top portion of the color strip 70 is grasped and the color strip 70 is removed from the display rack 80. The chip section 22 is then detached from the first paint color card 10. The chip section 22 may be detached by first applying pressure against the chip section 22 with a finger 100 to sever at least three of the tear lines 24, as shown in FIG. 11. The chip section 22 is then grasped and pulled in a direction away from and along the remaining tear line 24 so as to sever the remaining tear line 24 and fully detach the chip section 22, thereby forming the window 26.

As shown in FIG. 12, the first paint color card 10 is placed over the color strip 70 with both the layer 34 of the first paint color card 10 and the color swatches 74 of the color strip 70 facing upwardly. The first paint color card 10 is then positioned so that one of the color swatches 74 fills the window 26 and may be viewed therethrough. A determination is then made if the color of the color swatch 74 and the color of the layer 34 of the first colored coating composition are compatible. If not, the first paint color card 10 is then re-positioned so that another one of the color swatches 74 fills the window 26 and may be viewed therethrough. Another determination is then made. This procedure is repeated until the color of one of the color swatches 74 is found to be compatible with the color of the first colored coating composition, or until all of the color swatches 74 have been viewed through the window 26. If none of the colors of the color swatches 74 are found to be compatible, another color strip is selected and the foregoing procedure is repeated until a color swatch with a compatible color is found. Once a color swatch 74 with a compatible color is found, the name and/or the identifying code of the corresponding additional commercially-available paint composition is noted. The formulas for the first commercial paint composition and the additional commercially-available paint composition are retrieved using the names and/or identifying codes noted from the first paint color card 10 and the color strip 70, and the two paint compositions are produced therefrom at the mixing station.

By viewing the color swatches 74 through the window 26, a customer perceives how the additional commercially-available paint compositions will look when surrounded by the first commercial paint composition, thereby giving a preview of how the cabinet will look when it is painted with the foregoing paint compositions. Such a preview enables the customer to better select paints for the cabinet.

It should be appreciated that use of the first, second, and third paint color cards 10, 50, 60 is not limited to determining the compatibility of different colors of paint. The first, second, and third paint color cards 10, 50, 60 may also be used to determine the compatibility of different colored paint compositions with different types of wallpaper, curtains and upholstery. When doing so, portions of the wallpaper, curtains and upholstery may be viewed through the windows 26, 58 of the first, second, and third paint color cards 10, 50, 60.

The first, second, and third paint color cards 10, 50, 60 of the present invention provide numerous benefits over conventional cards. Since each of the first, second, and third paint color cards 10, 50, 60 has at least one side that comprises a single large color sample, the first, second, and third paint color cards 10, 50, 60 avoid color blending and impart better intensity to the color sample. The ability to form windows 26, 58 in the first, second, and third paint color cards 10, 50, 60 permits portions of items such as wallpaper, curtains and upholstery to be viewed while surrounded by the color sample, thereby giving a more accurate impression of how the items will look when surrounded by a wall covered with the commercial paint composition corresponding to the color sample. The construction of the first, second, and third paint color cards 10, 50, 60 with the windows 26, 58 beings formable therein (as opposed to the windows 26, 58 being preformed) permits groups of the first, second, and third paint color cards 10, 50, 60 to be stacked together without having interior edges (defining the windows 26, 58) becoming entangled.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of selecting paint, said method comprising the steps of:

selecting a paint color card comprising a substrate having a surface coated with a layer of a colored coating composition formulated to have a dried color that is substantially similar to dried color of a commercially-available paint composition, said paint color card having formed therein a plurality of perforations arranged in at least one tear line, said at least one tear line at least partially defining a chip section, wherein when the at least one tear line is severed, the chip section is movable to form a window in the paint color card;

selecting an item for comparison to the colored coating composition;

severing the at least one tear line;

moving the chip section to form a window in the paint color card; and disposing the paint color card over the item such that the item may be viewed through the window.

2. The method of claim 1, wherein the item is a color strip having a plurality of color swatches formed thereon, said color swatches being comprised of different colored coating compositions formulated to have dried colors that are substantially similar to the dried colors of commercially-available paint compositions, each of said color swatches having a size greater in every direction than the chip section of the paint color card.

3. The method of claim 2, further comprising the step of positioning the color strip such that one of the color swatches may be viewed through the window.

4. The method of claim 1, wherein the at least one tear line of the paint color card has ends separated by a space in which the paint color card is not perforated, and wherein the step of moving the chip section comprises folding the chip section over a second surface of the paint color card, said chip section being folded along a fold line extending between the ends of the at least one tear line in the space.

5. The method of claim 1, wherein the at least one tear line comprises a plurality of tear lines that define the chip section, and wherein the step of moving the chip section comprises detaching the chip section from the paint color card.

6. A method of selecting paint, said method comprising the step of:

selecting a paint color card comprising a substrate having a first surface coated in its entirety with a layer of a first colored coating composition formulated to have dried color that is substantially similar to dried color of a commercially-available paint composition, said paint color card having formed therein a plurality of perforations arranged in at least one tear line, said at least one tear line at least partially defining a chip section, wherein when the at least one tear line is severed, the chip section is movable to form a window in the paint color card.

7. The method of claim 6, wherein the paint color card has a second surface coated with a layer of the first colored coating composition.

8. The method of claim 6, wherein the paint color card has a second surface, having a surface area that is coated in its entirety with a layer of a second colored coating composition formulated to have a dried color that is substantially similar to dried color of a second commercially-available paint composition, said second colored coating composition having a different color than the first colored coating composition.

9. The method of claim 8, further comprising the steps of:

selecting an item for comparison to the second colored coating composition;

severing the at least one tear line;

moving the chip section to form a window in the paint color card; and disposing the paint color card over the item such that the item may be viewed through the window.

* * * * *

UNITED STATES PATENT AND TRADEMARK OFFICE

CERTIFICATE OF CORRECTION

PATENT NO. : 6,994,553 B2
APPLICATION NO. : 10/765788
DATED : February 7, 2006
INVENTOR(S) : Mary M. DaRif et al.

It is certified that error appears in the above-identified patent and that said Letters Patent is hereby corrected as shown below:

In the Specification

Column 2, Line 31, delete “marketing,”, and insert --marketing--.

Column 5, Line 19, delete “coatings”, and insert --coating--.

Column 5, Line 38, delete “38”, and insert --28--.

Column 7, Line 2, delete “coatings”, and insert --coating--.

Column 7, Line 22, delete “identify,”, and insert --indentify--.

In the Claims

Column 11, Line 1, delete “have dried”, and insert --have a dried--.

Signed and Sealed this
Twenty-sixth Day of May, 2015

Michelle K. Lee
*Director of the United States Patent and Trademark Office*